United States Patent [19]

Dickinson

[11] Patent Number: 4,694,574
[45] Date of Patent: Sep. 22, 1987

[54] PIPE SCRAPER
[75] Inventor: Alan J. Dickinson, Cramlington, England
[73] Assignee: British Gas Corporation, England
[21] Appl. No.: 741,530
[22] Filed: Jun. 5, 1985
[30] Foreign Application Priority Data
  Jun. 7, 1984 [GB] United Kingdom ............... 8414545
[51] Int. Cl.⁴ .............................................. B23D 21/06
[52] U.S. Cl. .................................... 30/94; 15/104.16; 15/104.09; 30/98
[58] Field of Search .................... 30/93, 94, 96, 97, 98, 30/103, 169, 170; 15/104.16, 104.09
[56] References Cited
  U.S. PATENT DOCUMENTS
  253,788   2/1882  Thomas .................................. 30/98
  1,932,462 10/1933 Howlett ................................. 30/97
  3,176,771  4/1965 Claiborne et al. ........... 15/104.16 X
  3,406,449 10/1968 Doerner ............................... 30/103
  4,479,538 10/1984 Coyle, Sr. ................... 15/104.16 X Primary Examiner—E. R. Kazenoke
Assistant Examiner—Willman Fridie, Jr.
Attorney, Agent, or Firm—Larson and Taylor

[57] ABSTRACT

A pipe scraper for scraping the end of a plastics pipe such as a plastics gas main or water main has a framework (10) in which is journaled a helically bladed rotary cutter (14) driven by means of a lever (17). On the shaft carrying the cutter is a pinion (16) which meshes with a larger pinion (19) driving a friction surface roller (21). The cutter is held in a Reed clamp and as the lever (17) is turned it rotates the helically bladed rotary cutter so as to scrape a low angle helical scrape approximating a longitudinal scrape. At the same time the rotation of the roller (21) causes the whole framework to rotate around the surface of the pipe so as to scrape the whole end peripheral surface.

6 Claims, 3 Drawing Figures

PIPE SCRAPER

This invention relates to a scraping device for scraping cylindrical objects such as plastic pipes of the type used for gas and water mains, for example.

It is necessary, for example, to be able to scrape the surface of plastic pipes adjacent the ends of the pipes so as to prepare the surface for application of jointing material or to provide a good seal in a joint.

It is desirable that the scraping action should be longitudinal which avoids the possibility of air entrapment at the interface.

The object of the invention is to provide a scraping device which may be used to scrape a cylindrical surface of an object and which combines the advantages of relative rotation with the advantages of essentially longitudinal scraping.

According to the present invention a scraper comprises a helically bladed rotary scraping member adapted to be applied to a cylindrical surface of an object while rotating around it. The scraping member forms a low angle helix scrape which approximates a longitudinal scrape on the surface. The scraping member comprises a support structure, an operating means, a drive means and step down gearing. The scraping member is mounted on the support structure and the operating means is operatively connected to the scraping member to rotate it. The operating means is also operatively connected via the gearing to the drive means to rotate it in driving engagement with the cylindrical object to effect relative rotation between the support structure and the cylindrical object.

In a preferred embodiment of the present invention the drive means comprises circular members in rolling engagement with opposite surfaces of the cylindrical object and the operating means is also operatively connected by the gearing to one of the circular members to rotate it in driving engagement with the cylindrical object to create relative rotation between the structure and the object.

The scraper according to this invention is particularly useful in dealing with plastic pipes such as polyethylene pipes.

Figure 1:
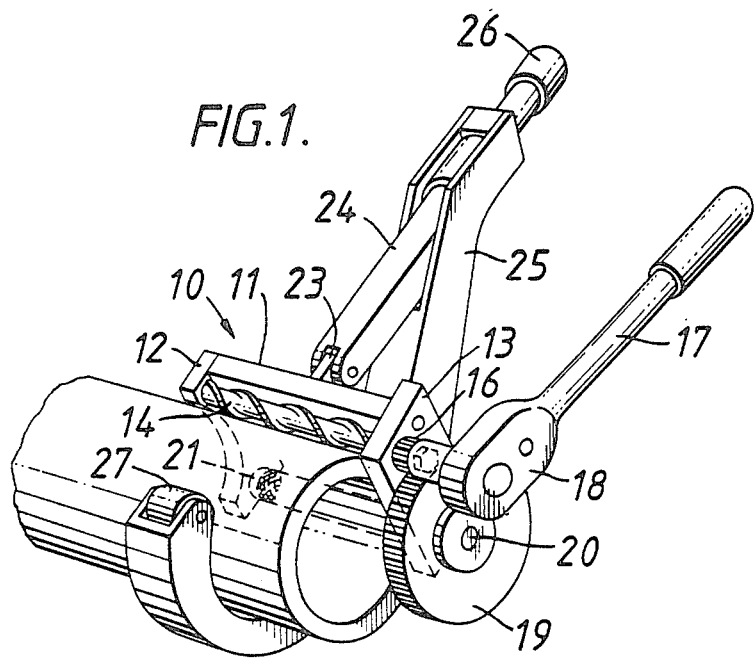
FIG. 1 is an isometric view of a scraper embodying the present invention as applied to an end of a plastics gas pipe.
Figure 2:
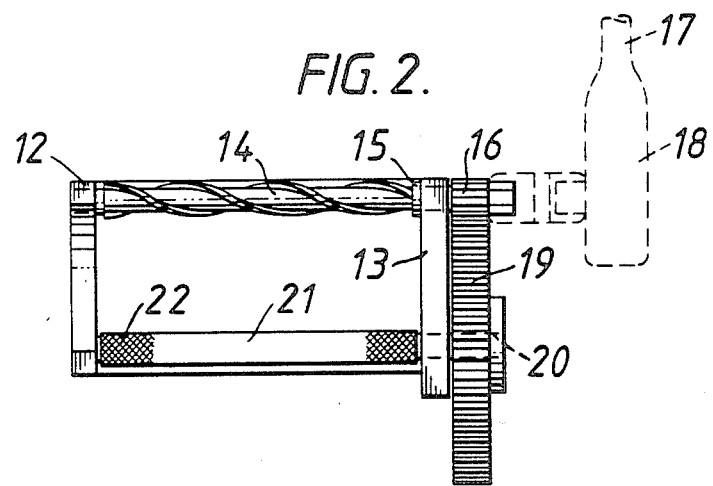
FIG. 2 is a plan view of the scraper but omitting the clamping part illustrated in FIG. 1.

The scraper has a framework 10 which comprises the base 11 and two end portions 12,13. Journaled between the end portions 12 and 13 is a helical bladed rotary cutter 14. The cutter 14 is on a shaft 15 which also carries a pinion 16 and may be rotated by means of a lever 17 acting through a ratchet device 18. The pinion 16 drives the larger pinion 19 mounted on a shaft 20 which carries a roller 21 having a frictional surface 22.

Pivoted to a lug 23 on the framework 10 is a restraining shaft 24 which is supported in a Reed clamp 25 of conventional design. When the scraper device is applied to a pipe the device is mounted on the shaft as shown in FIG. 1 and the Reed clamp tightened up by means of a knurled nut 26 so as to bring the helical bladed rotary cutter 14 and the roller 21 into contact with the surface of the pipe. The Reed clamp has a number of rollers such as 27 so that it supports the framework 10 for rotation around the pipe.

When the lever 17 is rotated it will rotate the helical bladed cutter 14 and also rotate the friction surfaced roller 21 at a much lower rate so that as the cutter rotates the whole assembly will move slowly around the outer peripheral surface of the pipe.

The design of the helical cutter is such that it will scrape a low angle helix which approximates to a longitudinal scrape parallel to the longitudinal axis of the pipe. At the same time the whole assembly will move round the periphery of the pipe so as to complete the scraping of the end portion of the pipe.

Figure 3:
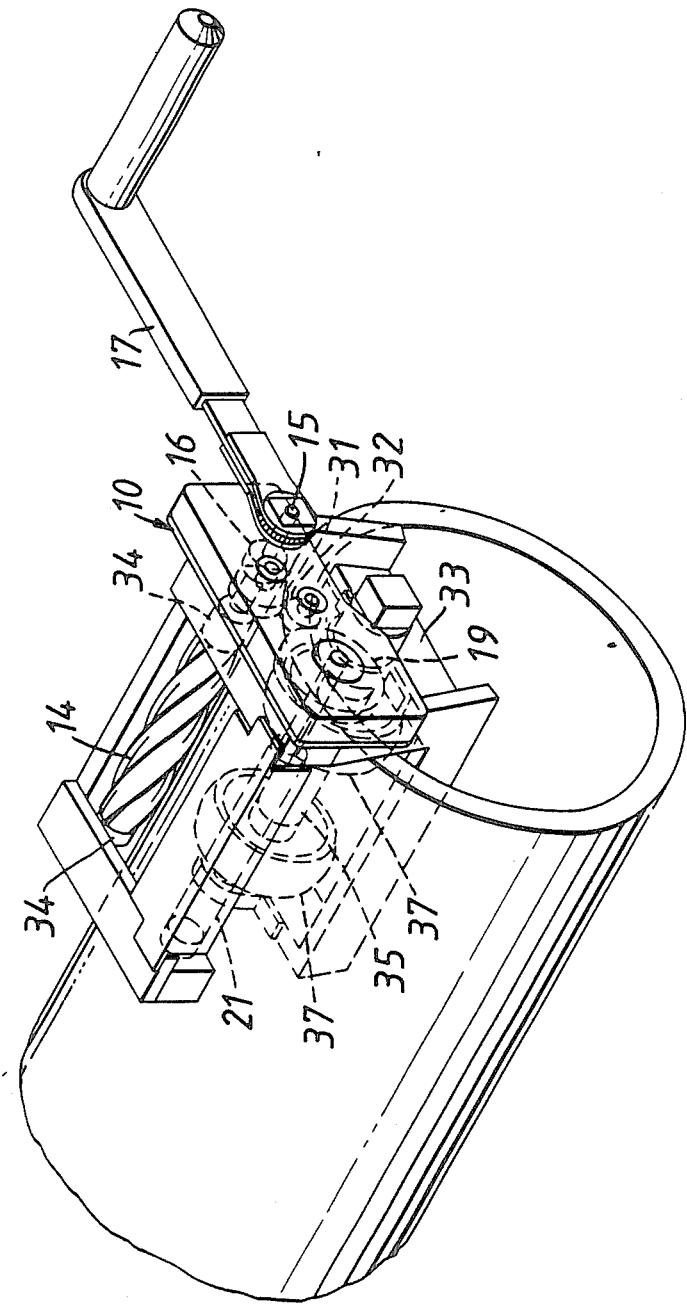
FIG. 3 is an isometric view of an alternative construction of the scraper.

FIG. 3 illustrates an alternative embodiment wherein an internal load bar is utilized to replace the Reed clamp 15 (FIG. 1). The load bar is a journaled shaft 35 mounted within a double cantilever frame 33 and aligned parallel to the longitudinal axis of the pipe. Shaft 35 carries a pair of pinch wheels 37 which bear upon the internal surface of the pipe and rotate round the inner surface of the pipe following the movement of the framework round the outer surface of the pipe.

In this embodiment the cutter 14 and the roller 21 are driven through a gear train housed in gear box 30, rather than through the pair of pinions 16,19 as illustrated in FIG. 1. It is preferred to provide a gear reduction ratio of between 3 to 4:1 from the cutter 14 to the roller 21. Furthermore, it is preferred that the cutter 14 and the roller 21 counter-rotate with respect to each other, so that they have a tendency to move away from each other. Thus by providing suitable intermediate pinions mounted on shafts 31,32, movement of the lever 17 to induce clockwise rotation of the shaft 15 will cause counter clockwise rotation of the roller 21.

In order to improve the contact of the cutter 14 and the roller 21 with the pipe surface, the ends of each may be independently suspended by providing resilient pads between the frame 10 and the respective bearing blocks at the ends of the shaft 15 and of the shaft on which the roller 21 is mounted.

The depth of cut may be controlled by the provision of gauge rings 34 (FIG. 3) at each end of the cutter 14.

I claim:

1. A scraper comprising:
a helically bladed rotary scraping member, and means for applying said scraping member to a cylindrical surface of an object while rotating past said surface such that said scraping member forms a low angle helix scrape which approximates a longitudinal scrape on said surface, said means comprising:
a support structure,
operating means,
drive means,
and step down gearing,
said scraping member and said drive means being mounted on said structure,
said operating means being operatively connected to said scraping member to rotate the same,
and also being operatively connected by said gearing to said drive means to rotate the same in rolling drive engagement with said object, thus relatively to rotate said structure and said object.

2. A scraper
a helically bladed rotary scraping member, and means for applying said scraping member to a cylindrical surface of a hollow cylindrical object while rotating past said surface such that said scraping member forms a low angle helix scrape which approximates a longitudinal scrape on said surface, said means comprising:

a support structure, operating means, drive means, and step down gearing, said scraping member and said drive means being mounted on said structure, said drive means comprising circular members in rolling engagement with opposite surfaces of said object, said operating means being operatively connected to said scraping member to rotate the same and also being operatively connected by said gearing to one of said circular members to rotate the same in driving engagement with said object, thus relatively to rotate said structure and said object.

3. A scraper according to claim 2, said operating means comprising a manually operable member and ratchet means operatively arranged between said manually operable member on the one hand and said scraping member and said gearing on the other.

4. A scraper according to claim 1, said operating means comprising a manually operable member and ratchet means operatively arranged between said manually operable member on the one hand and said scraping member and said gearing on the other.

5. A scraper according to claim 1, said structure comprising adjustable clamp means effective to hold said scraping member in contact with said object.

6. A scraper according to claim 2 said structure comprising a double cantilever formation having two parts respectively inside and outside said object and respectively supporting said circular members in rolling engagement with said opposite surfaces of said object.

* * * * *